Aug. 13, 1935.  M. G. JACOBSON  2,010,995

GAS TESTING

Filed Dec. 17, 1930

WITNESSES
AB Wallace
J Howard Flint

INVENTOR
Moses G. Jacobson
By Brown & Critchlow
Attorneys

Patented Aug. 13, 1935

2,010,995

UNITED STATES PATENT OFFICE 2,010,995

GAS TESTING

Moses G. Jacobson, Swissvale, Pa., assignor to Mine Safety Appliances Company, Pittsburgh, Pa., a corporation of Pennsylvania Application December 17, 1930, Serial No. 502,975

3 Claims. (Cl. 23—255)

This invention relates to gas testing by electrical means, and particularly to the determination of a combustible constituent in a gas.

An object of the invention is to provide a method of gas testing which potentiometrically detects the change in electrical resistance of a conductor in thermal contact with the gas, is simple, accurate, practical, adaptable to a variety of applications under varying conditions, and is especially suitated to the determination of a combustible constituent in air.

A further object is to provide an apparatus for use in the practice of the method referred to, which combines simplicity and sturdiness of construction with ease of use, ability to give reliable results, and adaptability to commercial use, and in which the various elements are readily accessible for inspection or repair.

Other objects will appear from the following description.

Figure 1:
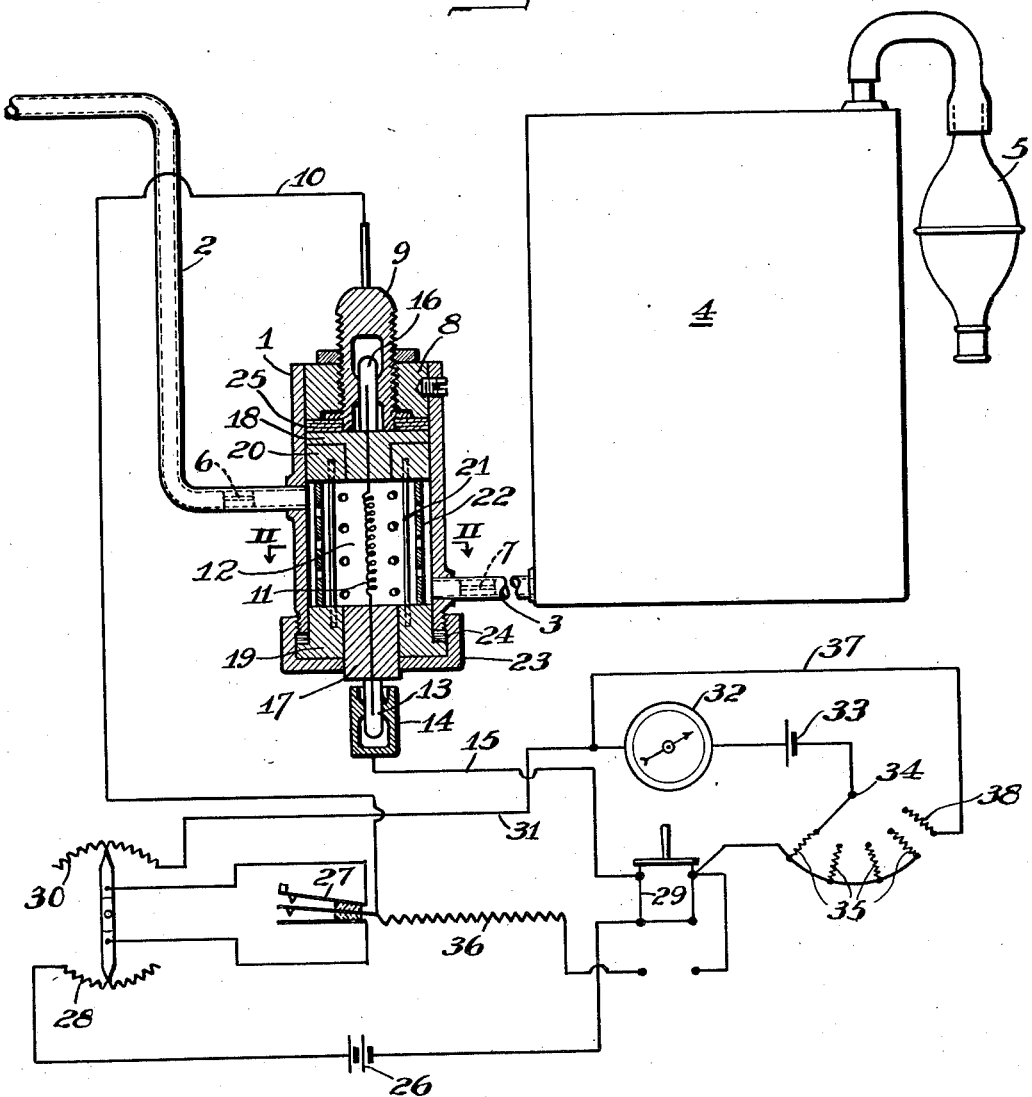
Figure 2:
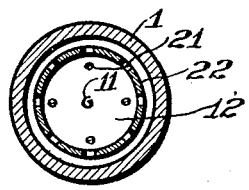

The invention may be described in connection with the accompanying drawing, in which Fig. 1 is an elevational view, partly in section, through the preferred embodiment of the apparatus, together with a diagrammatic representation of the electrical circuits; and Fig. 2 a horizontal section taken on line II—II, Fig. 1.

In the practice of this invention an electric current is passed through a main circuit including a conductor whose resistance varies with temperature, and by means of a secondary ciruit there is applied between two points of the circuit an opposed constant potential while contacting the conductor with standard gas. The gas to be tested is then passed into contact with the conductor, and the resultant change in resistance of the conductor is then measured by the current flow in the secondary circuit. As thus described, this represents a potentiometer system in its simplest aspect.

The opposed potential applied through the secondary circuit should be substantially constant, such as is provided by a standard cell, for example. For simplicity it is preferably equal to the potential difference between the two points of the main circuit to which it is applied, this being the usual custom in potentiometric practice. The current flow may be measured by any suitable means, such as a galvanometer.

The method is applicable to the analysis of gases such as flue gas and the like, in which case the resistance element is affected by the heat capacity of the gas, in a manner understood in the art. It is especially applicable to the determination of a combustible constituent, such as methane or petroleum vapor in air. In this application the gas is passed into contact with the resistance element under combustion-inducing conditions. This may be effected either by passing a current great enough to heat the resistance element sufficiently to cause combustion, or by exposing the gas to an oxidizing catalyst at or adjacent the resistance element. Thus, this element may be coated with a suitable catalyst, of which a number are known. This method is applicable also to complex gases in combination with suitable reducing catalysts, or to any gases causing by their chemical or physical change an alteration of the thermal balance of the resistance elements.

From what has been said it will be seen that the standard gas to which reference has been made may be chosen according to the gas undergoing test. For example, in testing a mine atmosphere, pure air is preferably used to obtain the initial, or zero, setting before passing in the atmosphere which is to be tested.

In the preferred practice of this invention there is used an apparatus comprising a container adapted for passage of the gas through it, which is provided at one end with a fixed closure and at the other end with a replaceably mounted testing unit. This unit comprises a resistance member projecting through the container. Electrical connections disposed in both closure members provide for insertion of the container in a potentiometer circuit, as will be described presently.

Having reference now to the drawing, the preferred form of apparatus comprises a container or housing 1 having an inlet pipe 2 for the introduction of the gas sample, and an outlet pipe 3 which preferably connects the unit with a tank 4 and an aspirator system 5. In the pipes 2 and 3, and adjacent the testing receptacle, are capillaries or constrictions 6 and 7 which serve to restrict flashing and to maintain a uniform gas flow.

The housing 1 may be cylindrical, and it is closed at one end by an annular plug of insulating material 8, through which there extends a fixed jack 9 connected to one external lead 10 of the main circuit. The housing with jack 9 and with the gas inlet and outlet pipes is intended to constitute a unitary member at the point of gas sampling or testing.

The other end of housing 1 is closed by a removable unit comprising an electric resistance 11, for example platinum, which is mounted at one end in an electrically conducting pin 13 connected externally by means of a jack 14 to the other lead 15 of the main circuit. Element 11 extends from pin 13 through gas testing chamber 12 and makes a sliding fit by a connector pin 16 in fixed jack 9.

Adjacent pins 13 and 16, element 11 is fitted in gas-tight manner through plugs of insulating material 17 and 18 respectively. These plugs respectively close the central openings of annular metal rings 19 and 20, spaced apart by posts 21. The rings 19 and 20 make a sliding fit with the walls of the receptacle, so as to make the chamber 12 gas-tight except for the inlet and outlet conduits 2 and 3, and they may be withdrawn together with element 11 through the open end of the receptacle.

Preferably the combustion space proper is confined within a cylinder 22 of perforated sheet metal, which surrounds element 11 about posts 21. The unit after insertion of the resistance into the jack 9 is locked in the receptacle by a cap 23 screw threaded to the open end of receptacle 1. Preferably, gas-tight gaskets 24 and 25 are disposed at each end of the unit, as shown in Fig. 1.

In the practice of the method provided by the invention, the apparatus is used with a potentiometer detector circuit. To this end the apparatus is in series connection with a main circuit including a battery 26, for example a storage or dry cell battery, a rheostat 28, a double switch 27, conductor 16, conductor 15, and a double pole, double throw switch 29. The branch in parallel with heater element 11 comprises the double switch 27 through rheostat 30 to switch 29. In order concisely to refer to this branch of the potentiometer circuit, it will be designated hereinafter as the "secondary, branch or galvanometer circuit". In this branch circuit are the conductor 31, a milliammeter or galvanometer 32, a standard of dry cell 33, with low temperature coefficient, opposed to battery 26, and a multitap switch 34 having a number of gradually increasing resistances 35. There is provided also between double pole, double throw switch 29 and double throw switch 27 a standard resistance 36 which may be thrown into parallel connection with the potentiometer circuit alternatively to the analysis resistance.

The operation is such that thermal changes in the sample gas flowing through the analysis unit affect the resistance of element 11, and these are indicated by galvanometer 32. In starting a test, rheostat 28 is adjusted preferably so that with the circuits closed the drop in potential of the leads and either resistance 11 or 36, as the case may be, across the points 27—29 equals the electromotive force of dry cell 33. Since the currents through galvanometer 32 from the two batteries 26 and 33 are opposed to each other, and in this illustration are equal to each other, the galvanometer reads zero. A sample of the gas to be tested is now drawn through the unit, as by means of aspirator 5, and the heat from element 11, assisted as it may be by suitable catalytic action, and by the heat of the metal walls of the combustion chamber, causes a slow combustion of combustible constituents present in the gas, for example methane in mine atmospheres, or hexane in gas at a petroleum field.

The resulting temperature rise causes a change of the resistance of element 11, and using a platinum resistance, the resistance is increased. This immediately alters the flow of current across the points common to the two circuits and destroys their balance, so that a current practically proportional to the change of resistance of the sensitive test wire 11 flows through galvanometer 32. Depression of double switch 27 thus enables an observer to determine the amount of thermal change in the test unit, and thus the amount of change in the composition of gas. This resulting change may be indicated in the potentiometer circuit as a simple milliammeter or galvanometer reading, or by an alarm, or by suitable registering or recording means, and continuous operation may be arranged as well as the intermittent action just described by way of illustration.

Standard cell 33 is one whose voltage changes but little during a considerable period of time. Nevertheless, it is an advantage of the arrangement provided by this invention that use of the apparatus effectively prolongs the life of this cell, since when an active gas or vapor is passed through the test chamber the flow of current is into this cell. In order to check whether changes have actually occurred, shunt circuit 37 around the milliammeter through resistance 38 may be closed at intervals, so as to observe whether the milliammeter reading has changed.

Since battery 26 is not constant, galvanometer 32 will drift slowly off zero. When the observer is in such an atmosphere that it would be impossible to set the instrument at zero for the standard reading by contacting element 11 with standard gas, for example in a mine with methane present, the zero point may be checked as though pure air were available as a standard by manipulation of double pole, double throw switch 29 to throw in resistance 36, which equals exactly the resistance of element 11 and its leads when that element is heated in pure air to normal initial temperature. Standard resistance 36 has a low or zero temperature coefficient. If a check shows that the zero point has changed, it may be readjusted by means of rheostat 28; then for operating, switch 29 again is thrown into the position which connects heater element 11 into the circuit.

Though drifting of the zero point of galvanometer 32 with change of voltage of battery 26 may be corrected by adjustment of rheostat 28, decrease of voltage of battery 26 also introduces a decrease of the sensitivity of the apparatus. For this reason means are preferably provided for readjusting this sensitivity automatically in readjusting the resistance in the secondary or galvanometer circuit. This is accomplished by double rheostat 28—30, arranged to change the resistance of the galvanometer circuit in proportion with that of the main or test circuit. Thus whenever resistance 28 is decreased to compensate for voltage drop of battery 26, there is a corresponding decrease of resistance 30 in the galvanometer or secondary circuit, thus maintaining the relative resistance of the two circuits and the sensitivity of the apparatus.

It is desirable to provide the secondary circuit with a number of gradually increasing resistances 35 to have available several ranges of sensitivities comparable to a number of widely varying gases and vapors, and to extend the flexibility of the set beyond that imparted by replacement of the heater wire unit.

For maximum efficiency it is important that the rate of flow of gas be substantially constant through chamber 12, and also that it be proportioned to the rate of thermal change of gas. Proper regulation of the gas flow to meet operating conditions may be obtained by variation of the constrictions 6 and 7 in the gas line, and of the perforations in shield 22 around resistance element 11.

Preferably, variations in the resistance of element 11 arise from the chemical reaction that occurs as the test sample of gas passes over it. It is within the scope of this invention, however, to modify this arrangement so that the combustion of gas at other points will be indicated in the change of resistance 11, or so that gases in which no combustion actually occurs, but in which there is a change of thermal properties, for example of the heat capacity or conductivity of the gas, likewise may be determined by the potentiometer circuit.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In a gas testing apparatus, a testing chamber provided with inlet and outlet openings for passage of gas therethrough, a main electric circuit including a thermally-responsive resistance element mounted in said chamber for contact with gas passed through the chamber, a secondary electric circuit in parallel with said main circuit, said main and secondary circuits forming a potentiometer circuit and said secondary circuit containing a current-indicating means and an E. M. F. connected in opposition to the main circuit and proportioned to said resistance element so that said element is heated to a predetermined temperature when the potentiometer circuit is in balanced condition, and a constant resistance, equal to said element when the latter is heated in the absence of a combustible gas to its correct initial temperature, connected to be switched into the circuit alternately to said element to obtain said balanced condition of the potentiometer circuit in the presence of combustible gas.

2. In a gas testing apparatus, a testing chamber provided with inlet and outlet openings for passage of gas therethrough, a main electric circuit including a thermally-responsive resistance element mounted in said chamber for contact with gas passed through the chamber, a secondary electric circuit in parallel with said main circuit, said main and secondary circuits forming a potentiometer circuit and said secondary circuit containing a current-indicating means and an E. M. F. connected in opposition to the main circuit and proportioned to said resistance element so that said element is heated to a predetermined temperature when the potentiometer circuit is in balanced condition, a standard resistance equal to said element connected to be switched into said main circuit alternatively to said element, and a double rheostat adapted to change the resistance of the potentiometer circuit in proportion to that of the resistance circuit.

3. In gas testing apparatus, a container provided with a gas inlet conduit and with a gas outlet conduit, means associated with one of said conduits for producing a definite flow of gas through the container, a main electric circuit including a thermally-responsive resistance element mounted in said container for contact with gas passed therethrough, a secondary electric circuit in parallel with said main circuit and forming therewith a potentiometer circuit, and a double rheostat adapted simultaneously to alter the resistance of said secondary circuit in equivalence to changes of resistance of the main circuit.

MOSES G. JACOBSON.